United States Patent [19]

Davis

[11] Patent Number: 4,606,126
[45] Date of Patent: Aug. 19, 1986

[54] DOUGH CUTTER

[76] Inventor: Nina Davis, 3232 San Mateo, NE. #215, Albuquerque, N. Mex. 87110

[21] Appl. No.: 708,550

[22] Filed: Mar. 5, 1985

[51] Int. Cl.⁴ .............................................. A21C 5/00
[52] U.S. Cl. ..................................................... 30/307
[58] Field of Search .................. 30/306, 307, 319, 292

[56] References Cited

U.S. PATENT DOCUMENTS

| | | | |
|---|---|---|---|
| 359,480 | 3/1887 | Weber | 30/307 |
| 646,075 | 3/1900 | Lacombe | 30/307 |
| 776,945 | 12/1904 | Riedel | 30/307 X |
| 1,200,284 | 10/1916 | Wheaton | 30/307 |
| 1,343,844 | 6/1920 | Rapavy | 30/307 |
| 1,473,698 | 11/1923 | DeFelippo | 30/307 |
| 1,758,328 | 5/1930 | Newsbaum | 30/307 |
| 1,807,009 | 5/1931 | Pinnelli | 30/307 X |
| 2,684,533 | 7/1954 | Kern | 30/307 X |
| 2,836,889 | 6/1958 | Joyet | 30/307 |
| 3,994,652 | 11/1976 | Kuzyk | 30/307 X |
| 4,156,968 | 6/1979 | Gould | 30/307 |

Primary Examiner—Jimmy C. Peters
Attorney, Agent, or Firm—Harvey B. Jacobson

[57] ABSTRACT

A generally U-shaped bracket is provided having a pair of generally parallel legs interconnected at one pair of corresponding ends by a bight portion extending between and secured relative to the one pair of ends of the legs. An elongated handle is provided and mounted at one end from the longitudinal mid-portion of the aforementioned bight portion and the other end of the handle projects outwardly from the side of the bight portion opposite the side thereof from which the legs project. A one-piece elongated roller extends between and is journalled from the outer ends of the legs and the roller includes a cylindrical outer surface having at least two circumferential grooves formed therein spaced apart longitudinally of the roller and from the opposite ends of the outer cylindrical surface of the roller. The grooves include inwardly convergent opposite side surfaces defining an included angle of approximately 30° and cylindrical bottom surfaces. The intersections between each of the cylindrical bottom surfaces on the corresponding side surfaces are radiused.

8 Claims, 4 Drawing Figures

U.S. Patent     Aug. 19, 1986     4,606,126
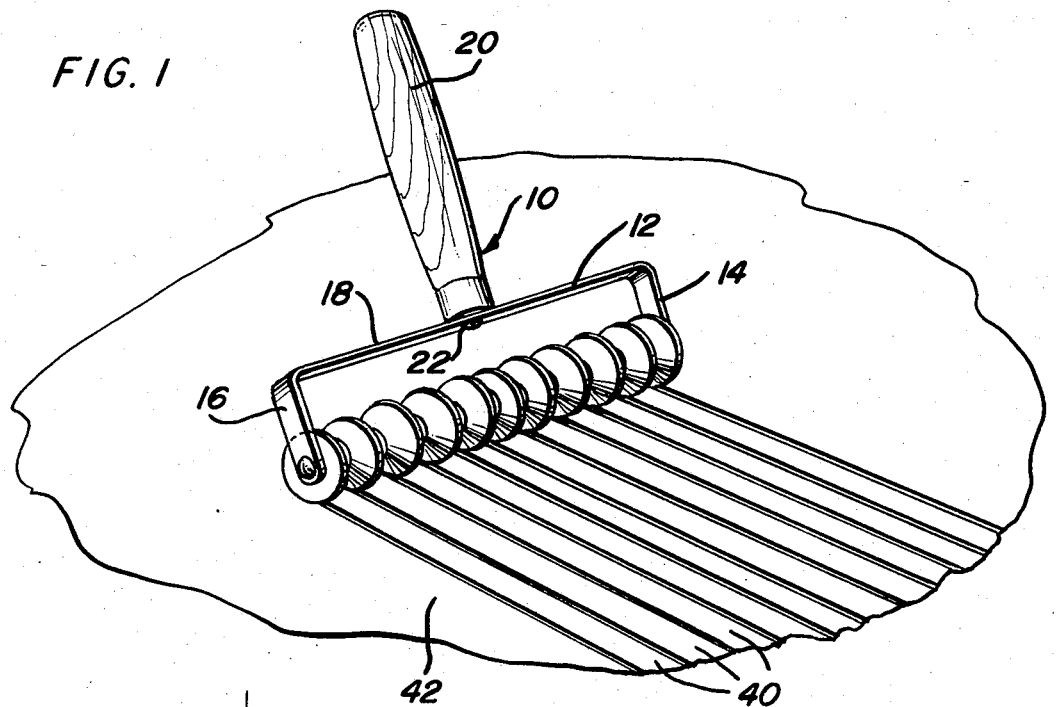
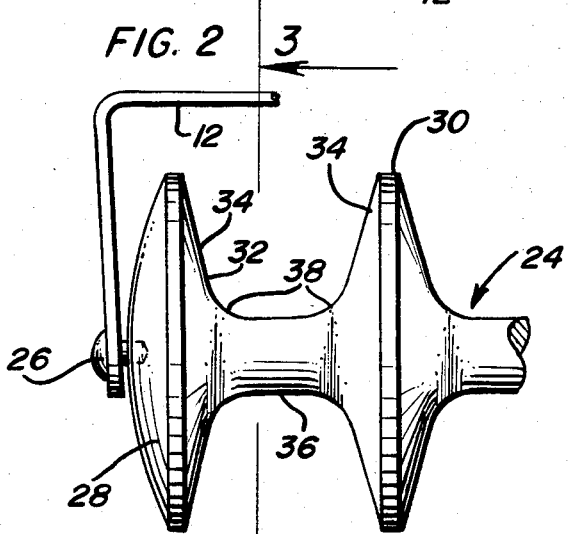
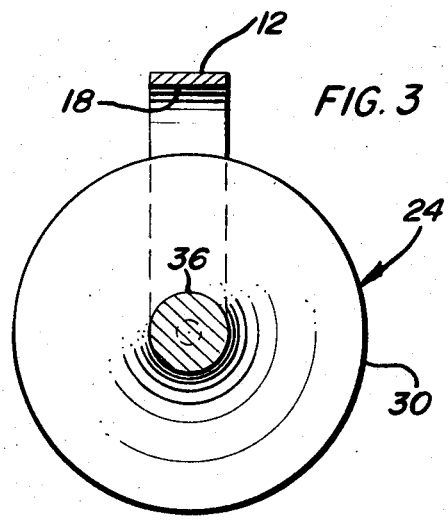
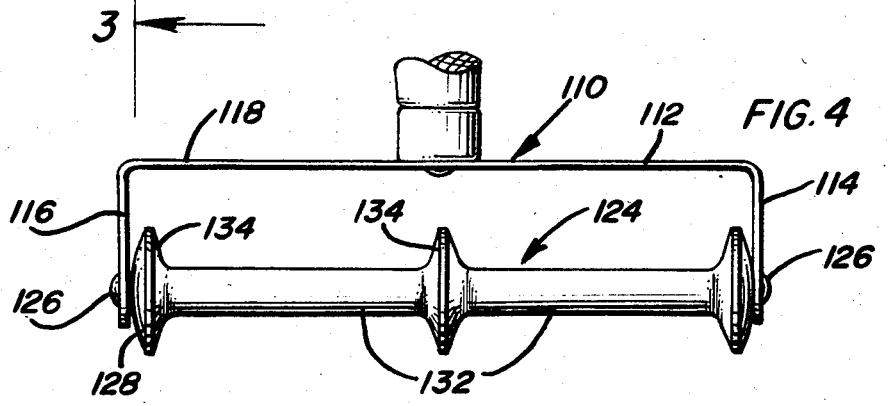

DOUGH CUTTER

BACKGROUND OF THE INVENTION

1. Field of the Invention

This invention relates to a handle-equipped roller including closely longitudinally spaced apart circumferential grooves formed therein. The roller may be used to cut various thicknesses of rolled dough into elongated strips of dough and the dough strips may be used to make a lattice crust for pies. The dough strips produced also may be used to make rolled cookies if the strips are cut to proper length. Further, the rolled dough to be cut may be cut by successive passes of the cutter along oppositely inclined diagonal paths in order to produce either parallelogram or diamond-shaped cut dough pieces.

2. Description of Related Art

Various different forms of dough cutters as well as other cutters including some of the general structural and operational features of the instant invention heretofore have been provided such as those disclosed in U.S. Pat. Nos. 1.58,694, 2,512,202, 2,684,533 and 3,286,349. However, these previously known forms of roller-type cutters are not specifically adapted for use in cutting various thicknesses of rolled dough.

SUMMARY OF THE INVENTION

The cutter of the instant invention includes a cylindrical roller having longitudinally spaced apart circumferential grooves formed therein with the roller journalled between the free ends of the arms of a U-shaped frame incorporating a bight portion extending between the other ends of the frame arms. The longitudinal mid-portion of the bight portion includes an outwardly projecting handle which extends from the bight portion in a direction opposite to the direction in which the arms extend.

There are two forms of cutters disclosed with each cutter including a roller of approximately 1 inch in diameter. A first form of cutter includes circumferential grooves formed therein which are approximately ½ inch in width and the second form of cutter includes grooves formed therein which are approximately 2½ inches in width. However, the spacing between adjacent grooves on each of the rollers is approximately the same and each of the grooves includes inwardly convergent sidewalls defining an included angle of approximately 30° and a substantially cylindrical bottom wall with the intersections between the sidewalls and the bottom wall of each groove being radiused. The depth of each groove is slightly greater than ⅓ the diameter of the roller and the axial spacing between each pair or adjacent grooves is approximately 0.025 inch.

The main object of this invention is to provide a dough cutter capable of simultaneously cutting a plurality of strips of rolled dough.

Another object of this invention is to provide a dough cutter wherein the plurality of strips of dough cut thereby are of the same width.

Still another important object of this invention is to provide a dough cutter which may be used effectively to cut strips of dough from rolled dough of varying thicknesses.

Yet another object of this invention is to provide a dough cutter which may be used to cut pieces of rolled dough of various shapes.

Another object of this invention is to provide a dough cutter including a grooved dough cutting roller of one-piece construction and wherein the outer surfaces of the roller are smooth and free of portions thereof in which foreign particles and materials may collect.

A final object of this invention to be specifically enumerated herein is to provide a dough cutter in accordance with the preceding objects and which will conform to conventional forms of manufacture, be of simple construction and easy to use so as to provide device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a first form of dough cutter constructed in accordance with the present invention and with the dough cutter being used to cut a plurality of strips from a panel of rolled dough;

FIG. 2 is a fragmentary enlarged elevational view of the left side of the dough cutter illustrated in FIG. 1;

FIG. 3 is a vertical sectional view taken substantially upon the plane indicated by the section line 3—3 of FIG. 2; and FIG. 4 is a fragmentary elevational view of a second form of dough cutter.

DESCRIPTION OF THE PREFERRED EMBODIMENTS

Referring now more specifically to the drawings, the numeral 10 generally designates a first form of dough cutter constructed in accordance with the present invention.

The dough cutter 10 includes a generally U-shaped bracket 12 incorporating a pair of generally parallel legs 14 and 16 interconnected at one pair of corresponding ends by a bight portion 18 extending between and anchored relative to the legs 14 and 16. An elongated handle 20 is also provided and has one end anchored relative to the longitudinal mid-portion of the bight portion 18 as at 22, the handle 20 projecting outwardly from the side of the bight portion 18 from which the legs 14 and 16 project.

A one-piece roller 24 is provided and is journalled between the free ends of the legs 14 and 16 by pivot fasteners 26 rotatably received through the free ends of the legs 14 and 16 and removably threaded in the opposite ends of the roller 24.

The opposite end faces of the roller 24 are partial spherical as at 28 and the roller 24 includes a cylindrical outer surface 30. In addition, the roller 24 has a plurality of circumferential grooves 32 formed therein and the grooves 32 are spaced apart longitudinally of the outer surface 30 and from the opposite end faces of the roller 24. The grooves 32 are of a depth slightly more than ⅓ the diameter of the roller 24 and each groove 32 includes opposite sidewalls 34 which are outwardly convergent and define an included angle of approximately 30°. The spacing between adjacent grooves 32 is approximately 0.025 inch and the depth of each groove 32 is approximately 0.40 inch. The bottom walls 36 of the grooves 32 are cylindrical and the intersections between the bottom walls 36 and the sidewalls 34 are radiused as at 38.

As may be seen from FIG. 1 of the drawings, the dough cutter 10 may be utilized to cut a plurality of elongated parallel and equal width strips 40 from a panel of rolled dough 42. In addition, individual cut pieces of dough may be formed by roll cutting the dough 42 in one direction and then again roll cutting the dough 42 in a direction disposed transverse to the first direction. The two directions in which the dough 42 are cut may be disposed at right angles relative to each other in order to form square pieces of cut dough, or the two directions in which the dough 42 is cut may be inclined less than 90° relative to each other.

With attention now invited more specifically to FIG. 4 of the drawings, a second form of dough cutter is referred to in general by the reference numeral 110. The dough cutter 110 is very similar to the dough cutter 10 except that the width of the grooves 132 in the roller 124 of the dough cutter 110 is approximately 2½ inches and thus considerably greater than the width of the grooves 32. Otherwise, the dough cutter 110 is identical to the dough cutter 10 and the various components of the dough cutter 110 are referred to by reference numerals in the 100 series corresponding to the reference numerals indicating the similar components of the dough cutter 10.

It is is desired, the dough cutters 10 and 110 may be alternately used, as desired or the dough cutter 10 may be used to form the strips 40 and the dough cutter 110 may be used to cut the strips 40 into shorter strips equivalent in length to the width of the grooves 132.

By having the sidewalls 34 of each groove 32 defining an included angle of approximately 30°, the edges of the cut dough pieces 40 are slightly rounded on their upper sides and precisely cut on their undersides. In addition, it will be noted that the roller 24 is of one-piece construction and that the exposed surfaces of the roller 24 are all smoothly curved and that no crevices or sharp corners are provided in which foreign material may collect.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A dough cutter for various different shapes or dough sections, said cutter including a generally U-shaped bracket having a pair of generally parallel legs interconnected at one pair of corresponding ends by a bight portion extending between and secured relative to said one pair of ends, an elongated handle having one end mounted from the longitudinal mid-portion of said bight portion with the other handle and end projecting outwardly from the side of the bight portion opposite the side from which the other ends of said legs project, an elongated one-piece roller extending between and journalled from the other ends of said legs, said roller including a circumferential cylindrical outer surface and at least two circumferential grooves formed therein spaced apart longitudinally of said roller and from the opposite ends of said cylindrical outer surface, said grooves including inwardly convergent opposite side surfaces defining an included angle of approximately 30 degrees and cylindrical bottom surfaces, the intersections between each of said cylindrical bottom surfaces and the corresponding side surfaces being radiused, said adjacent grooves being separated by a portion of said circumferential cylindrical outer surface of said roller having approximately 0.025 inches in width to thereby extrude dough therebeneath.

2. The dough cutter of claim 1 wherein the spacing between adjacent grooves is approximately 1/20 the width of each groove measured at the outer circumference of said roller.

3. The dough cutter of claim 1 where said grooves each are of a depth slightly greater than ⅓ the diameter of said roller.

4. The dough cutter of claim 3 wherein said roller is generally 1 inch in diameter.

5. The dough cutter of claim 4 wherein the spacing between adjacent grooves is approximately 1/20 the width of each groove measured at the outer circumference of said roller.

6. The dough cutter of claim 1 wherein said grooves equal two in number and are approximately 2½ times the diameter of said roller in width.

7. The dough cutter of claim 1 wherein said grooves are generally 1½ times the depth of said grooves in width.

8. The dough cutter of claim 1 wherein the spacing between adjacent grooves is generally 1/40 the diameter of said roller.

* * * * *